(12) United States Patent
Rymkowski et al.

(10) Patent No.: US 11,605,224 B2
(45) Date of Patent: Mar. 14, 2023

(54) AUTOMATED MEDIA EDITING OPERATIONS IN CONSUMER DEVICES

(71) Applicant: Apple Inc., Cupertino, CA (US)

(72) Inventors: Bartlomiej Rymkowski, Cupertino, CA (US); Robert Bailey, Cupertino, CA (US); Ethan Tira-Thompson, Cupertino, CA (US); Shuang Gao, Cupertino, CA (US); Ben Englert, Cupertino, CA (US); Emilie Kim, Cupertino, CA (US); Shujie Liu, Cupertino, CA (US); Ke Zhang, San Jose, CA (US); Vinay Sharma, Cupertino, CA (US); Xiaosong Zhou, Campbell, CA (US)

(73) Assignee: APPLE INC., Cupertino, CA (US)

(*) Notice: Subject to any disclaimer, the term of this patent is extended or adjusted under 35 U.S.C. 154(b) by 58 days.

(21) Appl. No.: 16/882,959

(22) Filed: May 26, 2020

(65) Prior Publication Data

US 2020/0380260 A1 Dec. 3, 2020

Related U.S. Application Data

(60) Provisional application No. 62/855,172, filed on May 31, 2019.

(51) Int. Cl.
*G06V 20/40* (2022.01)
*G06T 7/73* (2017.01)
*G06T 7/246* (2017.01)
*G06V 20/64* (2022.01)

(52) U.S. Cl.
CPC .............. *G06V 20/41* (2022.01); *G06T 7/246* (2017.01); *G06T 7/73* (2017.01); *G06V 20/46* (2022.01); *G06V 20/64* (2022.01); *G06V 20/44* (2022.01)

(58) Field of Classification Search
CPC ........... G06K 9/00718; G06K 9/00744; G06K 9/00201; G06K 2009/00738; G06K 2209/27; G06K 9/00751; G06T 7/73; G06T 7/246
See application file for complete search history.

(56) References Cited

U.S. PATENT DOCUMENTS

| | | | |
|---|---|---|---|
| 10,332,564 B1* | 6/2019 | Andrizzi | G11B 27/34 |
| 2008/0306995 A1* | 12/2008 | Newell | G06F 16/51 |
| | | | 707/E17.031 |
| 2009/0232417 A1* | 9/2009 | McMahan | G06F 16/58 |
| | | | 382/309 |

(Continued)

*Primary Examiner* — Amara Abdi
(74) *Attorney, Agent, or Firm* — BakerHostetler (57) ABSTRACT

Techniques disclosed for managing video captured by an imaging device. Methods disclosed capture a video in response to a capture command received at the imaging device. Following a video capture, techniques for classifying the captured video based on feature(s) extracted therefrom, for marking the captured video based on the classification, and for generating a media item from the captured video according to the marking are disclosed. Accordingly, the captured video may be classified as representing a static event, and, as a result, a media item of a still image may be generated. Otherwise, the captured video may be classified as representing a dynamic event, and, as a result, a media item of a video may be generated.

37 Claims, 5 Drawing Sheets

(56) References Cited

U.S. PATENT DOCUMENTS

| | | | |
|---|---|---|---|
| 2014/0268247 A1* | 9/2014 | Sakaida | H04N 1/00068 |
| | | | 358/450 |
| 2016/0292497 A1* | 10/2016 | Kehtarnavaz | G06V 10/809 |
| 2017/0118539 A1* | 4/2017 | Lokshin | H04N 21/8547 |
| 2017/0180676 A1* | 6/2017 | Oien | H04N 5/91 |
| 2017/0294210 A1* | 10/2017 | Abramson | G06V 20/47 |
| 2019/0034746 A1* | 1/2019 | Feng | G06V 10/993 |
| 2019/0114487 A1* | 4/2019 | Vijayanarasimhan | |
| | | | G06V 20/47 |
| 2019/0354601 A1* | 11/2019 | dePaz | G06V 20/40 |

* cited by examiner

AUTOMATED MEDIA EDITING OPERATIONS IN CONSUMER DEVICES

CROSS REFERENCE TO RELATED APPLICATION

This application claims the benefit of U.S. Provisional Application No. 62/855,172 filed on May 31, 2019, the disclosure of which is incorporated by reference herein.

BACKGROUND

The present disclosure relates to video summarization techniques and, in particular, to techniques for extracting media items based on scene, objects, and action recognition.

Users of mobile devices regularly and opportunistically capture videos of their surrounding environment. The amount of memory that is required to store these captured videos relative to the information they convey can be tremendous. Systems and methods are needed to automatically extract media items—still images or video sequences—from the captured videos. Such media items may provide compact representations and may be better focused on the experiences that the user most likely intended to capture and to conserve for future reference.

DETAILED DESCRIPTION

Techniques disclosed for managing video captured by an imaging device. Aspects of methods described in the present disclosure comprise capturing a video in response to a capture command received at an imaging device. Following a video capture, a method may classify the captured video based on feature(s) extracted from the captured video, may mark the captured video based on the classification, and may then generate a media item from the captured video according to the marking. In an aspect, the classifying of a video capture may identify the captured video as representing a static event, and, as a result, may generate a media item of a still image. Otherwise, the classifying of a video capture may identify the captured video as representing a dynamic event, and, as a result, may generate a media item of a video.

In an aspect, feature(s) extracted may be derived from object detection analysis, and so, for example, the classifying of the captured video may be based on detection of a predetermined object type from the captured video. In another aspect, the feature(s) extracted may be derived from scene recognition analysis, and so, for example, the classifying of the captured video may be based on recognition of a predetermined scene type from the captured video. In yet another aspect, the feature(s) extracted may be derived from motion recognition analysis, and so, for example, the classifying of the captured video may be based on recognition of a predetermined motion type from the captured video.

Techniques described herein, generate media items from a captured video based on an identification whether a static event or a dynamic event is represented in the captured video. When the classifying of the captured video identifies the captured video as representing a dynamic event, a video media item may be marked out from the captured video by marking a beginning or an end of the video media item in the captured video. The marking of a beginning or an end may be, for example, based on: appearance or disappearance of detected object(s) in the captured video; an act associated with a recognized predefined action type in the captured video; or a location in the captured video temporally related to a receiving time of the capture command. When the classifying of a captured video identifies the captured video as representing a static event, in an aspect, a quality level of the still image media item may be determined, as well as quality levels of frame(s) from the captured video. Then, if a quality level of a frame from the captured video is higher than the quality level of the still image media item, a user of the imaging device may be prompted; and if authorized by the user, the still image may be replaced with the higher quality frame. For example, a quality level of a frame may be determined based on a pose, an orientation, or an appearance of an object recognized in the captured video.

Figure 1:
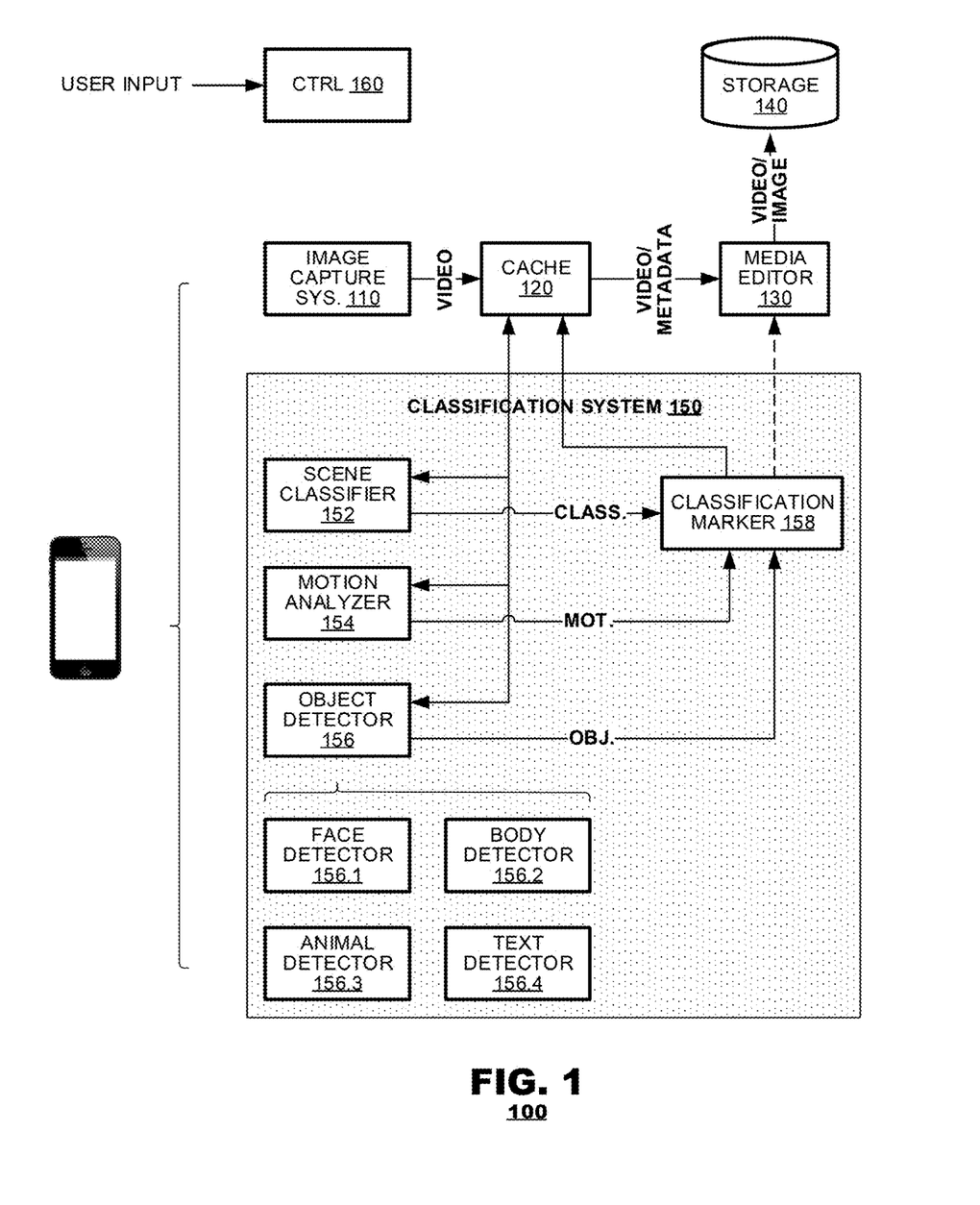
FIG. 1 is a functional block diagram of a media editing system according to an aspect of the present disclosure.

FIG. 1 illustrates a system 100 according to an aspect of the present disclosure. The system 100 comprises an image capture system 110, a cache 120, a media editor 130, storage 140, a classification system 150, and a controller 160. The capture system 110 may generate video content representing a local environment. The capture system 110 may utilize a single sensor camera system, a multi-sensor camera system or other sensory capturing means to generate a representation of the environment. Common camera systems include CMOS image sensors and CCD image sensors, for example. The capture system 110 may output video to a cache 120, where the video is stored temporarily for processing by the other components illustrated in FIG. 1.

The media editor 130 may generate media item(s) from the video stored in the cache 120 based on classification metadata from the classification system 150. The media editor 130, for example, may extract a frame from cached video and may store it in storage 140 as a still frame image. Alternatively, the media editor 130 may extract a span of cached video (a video sequence within the cached video) and may store it in storage 140 as a video item. Media items (e.g., still frame images and video items) in storage 140 may be addressed independently of other stored media items by a file system (not shown) of the system 100.

The classification system 150 may generate classification metadata for elements of cached video based on analyses of the video. The classification system 150 may include computing units that may analyze video content and may perform classification. The classification system 150 may comprise a scene classifier 152, a motion analyzer 154, and an object detector 156. Object detection 156 may be performed for different types of object(s), for example, human face detection 156.1, human body detection 156.2, animal detection 156.3, and/or text detection 156.4. The classification system 150 may include a classification marker 158 that may mark portions of cached video with classification(s) determined by the classification system 150, for example, by means of the classification units: 152, 154, and 156. In an aspect, the metadata outputted by the classification marker 158 may be fed to the cache 120, where it may be stored until the cached video is processed by the media editor 130. In another aspect, the metadata may be fed directly to the media editor 130.

Figure 2:
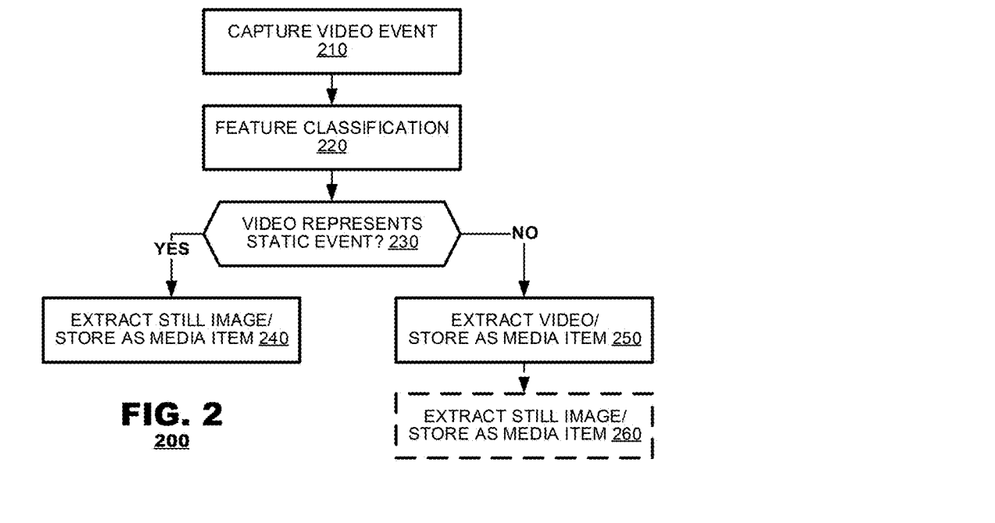
FIG. 2 illustrates a method according to an aspect of the present disclosure.

FIG. 2 shows a method 200 according to an aspect of the present disclosure. The method 200 may begin when a video event is captured (box 210). The method 200 may perform feature classification on the captured video (box 220). Thereafter, the method 200 may determine based on the classification whether the captured video represents a static event (box 230). If so, the method 200 may extract a still image from the cached video and store it as a media item (box 240). If the classification indicates that the video does not represent a static event, the method 200 may extract a video sequence and store it as a media item (box 250). In an aspect, the method 200 may also extract a still image from the media item and store it as a media item (box 260).

Static event classifications may be performed in a variety of ways. In one aspect, scene classification 152 may be performed on video content to recognize a scene. A scene classifier 152 may be implemented as a machine learning system that has been trained with data representing content of often-used capture events, such as portraits, action shots, landscapes, or architecture. When a scene classifier 152 classifies contents according to a preprogrammed scene type, it may indicate whether a capture video event represents a static event or not.

Motion analysis 154 may be performed to estimate the motion of object(s) within video content. For example, when different content elements within a video exhibit different motions from each other, it can indicate that foreground content is moving with respect to background content. Moreover, when a video exhibits consistent motion within frames and that motion accumulates to large levels across a video sequence, it may indicate that the camera had been panning during the video capture. In such cases, for example, a video may be classified as not representing a static event.

In contrast, motion analysis may indicate that a camera is being held relatively still and content within the image is also relatively still. For example, when a human operator attempts to hold a camera still on a still subject, often motion will not accumulate to large levels across a video sequence. Significant frame-to-frame motion may be observed in a small set of frames but typically, such motion will be counteracted in other frames. In such a circumstance, for example, the video may be classified as representing a static event.

Object detection 156 may be performed to determine if a video represents a static event. First, human face detection, human body detection, and/or animal detection may be performed to determine if video content contains any such objects. If such objects are identified, then motion analyses of regions of video content occupied by such objects may be used to determine whether the video represents a static event or not. When such objects exhibit motion greater than a threshold amount, then the video may be classified as non-static. When such objects exhibit motion less than a threshold amount, then the video may be classified as static.

Text detection may inform the classification, in another aspect. When a video is identified as containing text and the text is detected as having low motion content, a video sequence may be classified as representing a static event. For example, attempts to image documents, signs, whiteboards, and the like may generate video with low motion and with text characters that may be recognized by a text detector 156.4 (FIG. 1). In another aspect, when a video is classified as having both face/body/animal object(s) and text object(s), the video may be classified as non-static.

Other aspects may employ still other object detection (not shown in FIG. 1). For example, an object detector 156 (FIG. 1) may be trained to recognize other traditionally static objects such as buildings, landscapes, etc. which may be used for classification. Or, an object detector 156 (FIG. 1) may be trained to recognize other traditionally non-static objects such as in the air airplanes or birds, vehicles on the highway, etc. which may be used for classification.

Figure 3:
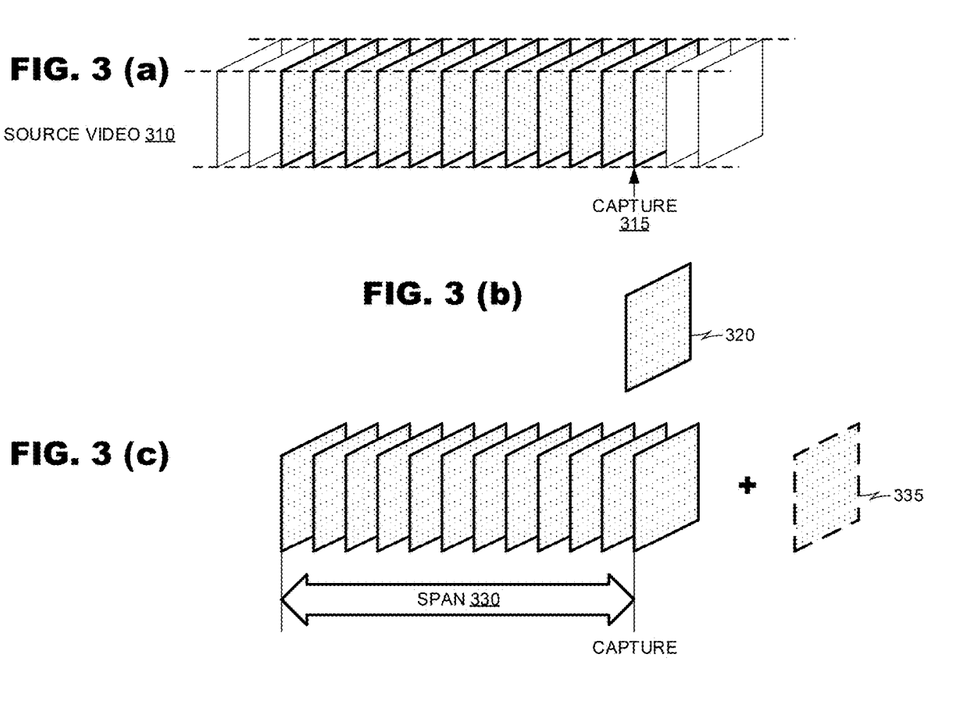
FIG. 3 illustrates an application of the method of FIG. 2 to an exemplary video sequence.

FIG. 3 shows exemplary media items that may be generated by the application of method 200 (FIG. 2) to an exemplary video sequence. FIG. 3(a) illustrates an exemplary source video sequence 310 captured by a capture system 110 (FIG. 1) that includes a plurality of video frames. A capture event 315 may be indicated to the capture system 110, for example, by a user command entered through a user interface (not shown) of a capture system. When the operation of the method 200 (FIG. 2) indicates that the video sequence represents a static event, the system may store a still image 320 to storage 140 (FIG. 1). When the operation of the method 200 (FIG. 2) indicates that the video sequence represents a non-static event, the system may store a span of video 330 (a video sequence within the cached video) to storage. In an aspect, the system also may store a still image 335 in addition to, or as a representation of, the video span 330.

Figure 4:
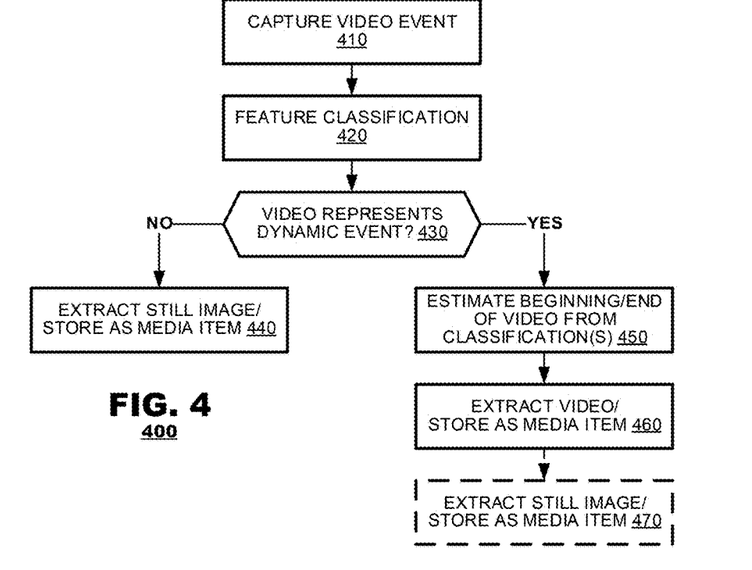
FIG. 4 illustrates a method according to an aspect of the present disclosure.

FIG. 4 shows another method 400 according to an aspect of the present disclosure. The method 400 may begin when a video event is captured (box 410). The method 400 may perform feature classification on the captured video (box 420). Thereafter, the method 400 may determine whether the classification indicates that the captured video represents a dynamic event (box 430). If not, the method 400 may extract a still image from the cached video and store it as a media item (box 440). However, if the classification indicates that the captured video represents a dynamic event, the method 400 may estimate a beginning and/or an end of the video span based on classification(s) of the video (box 450). Thereafter, the method 400 may extract a video sequence that extends between the estimated beginning and the estimated end, and may store it as a media item (box 460). In an aspect, when a video sequence is extracted and stored, the video sequence may be represented by, and may be stored with, a still image (box 470).

Dynamic event classifications may be performed in the same ways as discussed above with respect to FIG. 2.

Estimations of the beginning and/or the end of the video span may be performed in a variety of ways—e.g., based on methods of action recognition. For example, object detection may be performed to identify object(s) that appear in the cached video content. The method 400 may identify location(s) within the cached video in which object(s) begin or cease movement, or in which object(s) performs a predefined action to estimate a beginning and or an end of a video span. Likewise, the method 400 may identify location(s) within the cached video where object(s) appear, disappear, and/or become occluded to estimate a beginning and or an end of a video span. For example, a classifier may identify object(s) that exist in frame content at a time when an operator's "capture" command is received. The method 400 may search a span of video surrounding a frame temporally related to the capture command to determine when the object(s) first appears in the span and when the object(s) disappears from the span (or becomes occluded). The time of the appearance and the time of the disappearance of the object(s) may be selected as estimated beginning and end of the video span, respectively.

Alternatively, the method 400 may identify object(s) that are within a central location within a frame content at a time when an operator's "capture" command is received. Thus, the method 400 may search a span of video surrounding a frame temporally related to the capture command to determine when the object(s) first enters the central location and when the object(s) exit the central location. The times of entry and exit of the object(s) may be selected as the estimated beginning and the estimated end of the video span, respectively.

Figure 5:
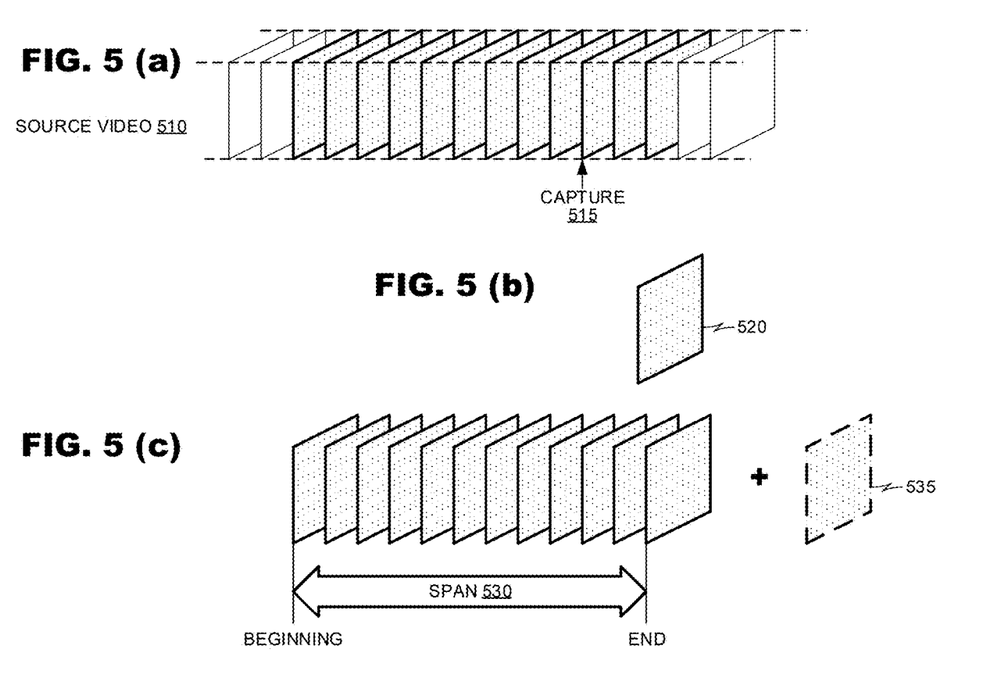
FIG. 5 illustrates an application of the method of FIG. 4 to an exemplary video sequence.

FIG. 5 shows examples for media items that may be generated by the application of method 400 (FIG. 4) to an exemplary video sequence. FIG. 5(*a*) illustrates an exemplary source video sequence 510 that may be captured by the capture system 110 (FIG. 1); the source video sequence 510 may include a plurality of video frames. A capture event 515 may be indicated to the capture system 110, for example, by a user command entered through a user interface (not shown) of the capture system. When the operation of the method 400 (FIG. 4) indicates that the video sequence does not represent a dynamic event, the system may store a still image 520 to storage 140 (FIG. 1). When the operation of the method 400 (FIG. 4) indicates that the video sequence represents a dynamic event, the system may store a span of video 530 to storage. A beginning and an end of the span 530 may be selected surrounding a capture event 515 based upon classification(s). In an aspect, the system may also store a still image 535 in addition to, or as a representation of, the video span 530.

Figure 6:
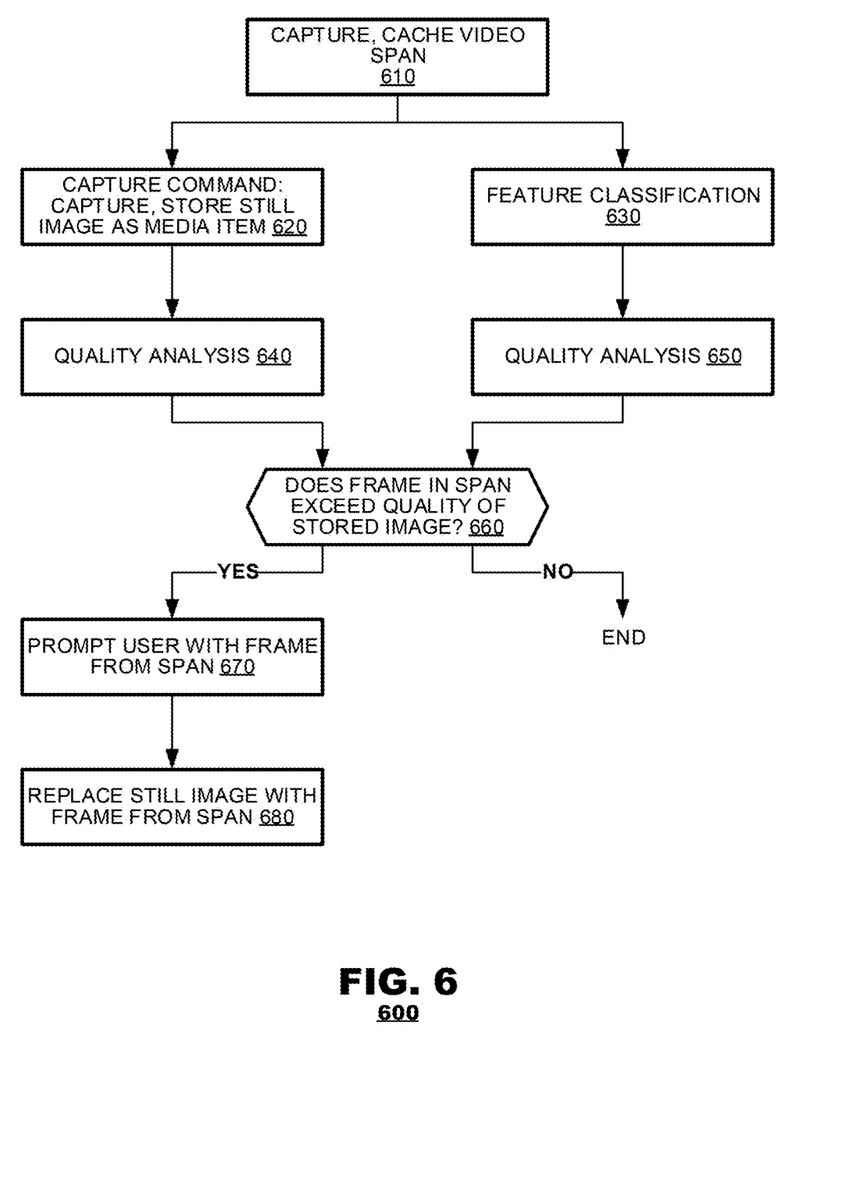
FIG. 6 illustrates a method according to another aspect of the present disclosure.

FIG. 6 illustrates a method 600 according to another aspect of the present disclosure. The method 600 may begin by capturing and caching a span of video (box 610). When a user's capture command is received, the method 600 may store a still image from the span that coincides with the capture command (box 620). The still image may then be stored in storage 140 (FIG. 1) as an indexable media item. The method 600 may perform feature classification operations on the span of video to which the still image belongs (box 630). Then, the method may perform quality analyses on frames from the span of video to which the still image belongs (boxes 650). The method may also perform quality analyses on the still image (boxes 640). The method 600 may then proceed with determining whether a frame from the span of video has an estimated quality that exceeds the estimated quality of the still image (box 660). If so, the method 600 may prompt a user to replace the still image with the frame that has higher quality (box 670). If authorized by a user in response to the prompt, the method 600 may replace the still image stored at box 620 with the higher-quality frame identified in box 660 (box 680).

The quality level of a frame captured and stored as a still image 620 or the quality level of a frame from the cached video 610 may be determined based on quality analyses 640, 650; such quality analyses may be performed in a variety of way. Object classifications often indicate a state of objects that a detector 156 (FIG. 1) may be trained to classify—such as an object's pose, orientation, or appearance. For human faces, for example, a detector 156.1 may generate metadata identifying the state of a detected face—whether the subject's eyes are open, whether the subject is smiling, an orientation of the subject's face (e.g., whether facing the camera, at a profile view, or at some other angle), or whether the subject's face is occluded. Similarly, body detectors and animal detectors 156.2, 156.3 may generate metadata identifying orientation of the body, body posture, and other indicators.

Quality level may be determined based on action recognition that may be derived from motion analyses. Motion analyzers may detect motion within image content, which may determine whether an object(s) within video content is moving or is at rest. For a scene classified as a portrait, a frame with little or no motion may be deemed to have higher quality than another frame with larger motion content. For a scene classified as an action shot, objects may be tracked along motion trajectories and a frame may be selected as having high quality at predetermined points along the trajectory (e.g., at the highest point for a subject classified as jumping, at the lowest point for a subject falling into water, etc.).

Other classifiers of image quality may include image attributes such as sharpness, exposure, or noise. For example, images with low camera blur may be deemed to have higher quality than images with high camera blur. Or, images with stable exposure parameters may be deemed to have higher quality than images where exposure settings are changing.

Figure 7:
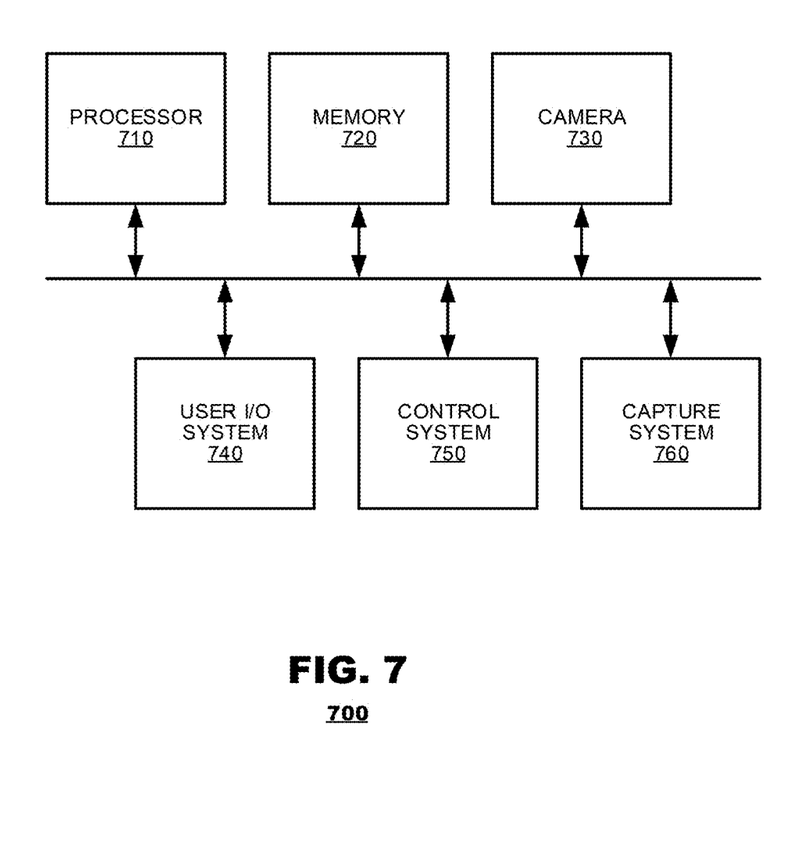
FIG. 7 illustrates a system diagram of imaging device, according to aspects of the present disclosure.

FIG. 7 is a system diagram of imaging device 700, according to aspects of the present disclosure. The imaging device 700 may include a processor 710, a memory 720, a camera 730, a user I/O system 740, a control system 750, and a capture system 760. The imaging device's 700 camera 730 (and/or other sensors), the user input/output system (I/O) 740, the control system 750, and the capture system 760 may communicate with the processor 710 and the memory 720 by a communication bus. The operation of the classification system shown in FIG. 1 and methods 200, 400, and 600, shown in FIGS. 2, 4, 6, respectively, may be performed by the processor 710, executing program instructions, run by an operating system, stored in the memory 720. The program instructions and the operating system may be written in any programming language, such as, for example, C, Java, Objective-C, C+, Python, Visual Basic, Perl, or any other programming language capable of producing instructions that are capable of execution on the processor 710.

The control system 750 may cooperate to control operation of the camera 730. For example, the control system 750 may control parameters of video capture that may be defined by a user's input 740. The control system 750 may perform auto-focus and/or auto-exposure control of the camera 730. The control system 750 may also control operational parameters of the capture system 760. The control system 750 may be implemented separately from processor 710 and may include dedicate hardware logic circuits. It may further include its own local memory for storage of, for example, video capture parameters.

The camera 730 may capture video in response to a user capture command 740. The user I/O system 740 may include buttons or a touchscreen controller to accept a user's input. I/O system 740 may also include display devices to render information, such as image or video data, during operation or when reviewing captured video data.

The processor 710 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute operating system and applications to facilitate capturing of video data and to perform the methods disclosed herein.

Memory 720 may be configured to store both programs and data. As indicated, the memory 720 may store instructions for operating system and applications that perform methods according to aspects of the present disclosure in machine readable form. For example, the memory 720 may store video data captured by the camera 730 and may store cached frames 120 of captured video, as illustrated in FIG. 1. The memory 720 may also store system information, user information, and the like. The memory 720 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a memory 720 or other machine readable medium, which may be incorporated into a computer program product.

The foregoing discussion has described operation of the foregoing embodiments in the context of a computer device such as a digital camera. Commonly, these cameras are provided as electronic devices such as personal computers, notebook computers, mobile computing platforms such as smartphones and tablet computers, dedicated gaming systems, portable media players, computer servers, and the like. As described, they may execute programs that are stored in memory of those devices and be executed by processors within them. Alternatively, they can be embodied in dedicated hardware components such as application specific integrated circuits, field programmable gate arrays and/or digital signal processors. And, of course, these components may be provided as hybrid systems that distribute functionality across dedicated hardware components and programmed general purpose processors, as desired.

Several aspects of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method for managing video captured by an imaging device, comprising:
    capturing a video of an event;
    receiving, at a command time during the capturing and after the beginning of the capturing, a command to capture the event in the captured video;
    classifying the event as either a static event or dynamic event based on the command time after the beginning of the event and on feature(s) extracted from frame(s) of the captured video proximate to the command time;
    searching in the captured video for frames captured both before and after the command time that represent the event based on the classification; and
    generating a media item from a subset of the captured video identified in the searching.

2. The method of claim 1, wherein:
    when the classifying identifies the captured video as representing a static event, the generated media item is a still image; and
    when the classifying identifies the captured video as representing a dynamic event, the generated media item is a video.

3. The method of claim 1, wherein the feature(s) extracted are derived from object detection analysis and the classifying is based on detection of a predetermined object type from the captured video.

4. The method of claim 1, wherein the feature(s) extracted are derived from scene recognition analysis and the classifying is based on recognition of a predetermined scene type from the captured video.

5. The method of claim 1, wherein the feature(s) extracted are derived from motion recognition analysis and the classifying is based on recognition of a predetermined motion type from the captured video.

6. The method of claim 1, wherein the feature(s) extracted are derived from motion recognition and object detection analyses and wherein,
    when a detected object is recognized to have motion that is greater than a threshold amount, the classifying identifies the captured video as representing a dynamic event, and when
    the detected object is recognized to have motion that is lower than a threshold amount, the classifying identifies the captured video as representing a static event.

7. The method of claim 2, wherein:
    when the classifying identifies the captured video as representing a dynamic event, the identifying frames in the captured video based on the classification comprises identifying a beginning or an end of the event.

8. The method of claim 7, wherein the identifying a beginning or an end of the event is based on appearance or disappearance of detected object(s) in the captured video.

9. The method of claim 7, wherein the identifying a beginning or an end of the event is based on an act associated with a recognized predefined action type in the captured video.

10. The method of claim 7, wherein the identifying a beginning or an end of the event is based on a location in the captured video temporally related to a receiving time of the capture command.

11. The method of claim 2, further comprising:
    when the classifying identifies the captured video as representing a static event, determining a quality level of the still image;
    determining quality levels of frame(s) from the captured video;
    if a determined quality level of a frame of the frame(s) is higher than the determined quality level of the still image, prompting a user of the imaging device; and
    if authorized by the user, replacing the still image with the higher quality frame.

12. The method of claim 11, wherein a quality level of a frame is determined based on
    recognizing an object's state in the frame, wherein a state of an object comprises a pose, an orientation, or an appearance.

13. A computer system, comprising:
    at least one processor associated with an imaging device;
    at least one memory comprising instructions configured to be executed by the at least one processor to perform a method comprising:
    capturing a video of an event;
    receiving, at a command time during the capturing and after the beginning of the capturing, a command to capture the event in the captured video;

classifying the event as either a static event or dynamic event based on the command time after the beginning of the event and on feature(s) extracted from frame(s) of the captured video proximate to the command time;

searching in the captured video for frames captured both before and after the command time that represent the event based on the classification; and generating a media item from a subset of the captured video identified in the searching.

14. The system of claim 13, wherein:

when the classifying identifies the captured video as representing a static event, the generated media item is a still image; and when the classifying identifies the captured video as representing a dynamic event, the generated media item is a video.

15. The system of claim 13, wherein the feature(s) extracted are derived from object detection analysis and the classifying is based on detection of a predetermined object type from the captured video.

16. The system of claim 13, wherein the feature(s) extracted are derived from scene recognition analysis and the classifying is based on recognition of a predetermined scene type from the captured video.

17. The system of claim 13, wherein the feature(s) extracted are derived from motion recognition analysis and the classifying is based on recognition of a predetermined motion type from the captured video.

18. The system of claim 13, wherein the feature(s) extracted are derived from motion recognition and object detection analyses and wherein, when a detected object is recognized to have motion that is greater than a threshold amount, the classifying identifies the captured video as representing a dynamic event, and when the detected object is recognized to have motion that is lower than a threshold amount, the classifying identifies the captured video as representing a static event.

19. The system of claim 13, wherein:

when the classifying identifies the captured video as representing a dynamic event, the identifying frames in the captured video based on the classification comprises identifying a beginning or an end of the video media item.

20. The system of claim 19, wherein the identifying a beginning or an end of the video media item is based on appearance or disappearance of detected object(s) in the captured video.

21. The system of claim 19, wherein the identifying a beginning or an end of the video media item is based on an act associated with a recognized predefined action type in the captured video.

22. The system of claim 19, wherein the identifying a beginning or an end of the video media item is based on a location in the captured video temporally related to a receiving time of the capture command.

23. The system of claim 13, further comprising:

when the classifying identifies the captured video as representing a static event, determining a quality level of the still image;

determining quality levels of frame(s) from the captured video;

if a determined quality level of a frame of the frame(s) is higher than the determined quality level of the still image, prompting a user of the imaging device; and if authorized by the user, replacing the still image with the higher quality frame.

24. The system of claim 23, wherein a quality level of a frame is determined based on recognizing an object's state in the frame, wherein a state of an object comprises a pose, an orientation, or an appearance.

25. A non-transitory computer-readable medium comprising instructions executable by at least one processor associated with an imaging device to perform a method, the method comprising:

capturing a video of an event;

receiving, at a command time during the capturing and after the beginning of the capturing, a command to capture the event in the captured video;

classifying the event as either a static event or dynamic event based on the command time after the beginning of the event and on feature(s) extracted from frame(s) of the captured video proximate to the command time;

searching in the captured video for frames captured both before and after the command time that represent the event based on the classification; and generating a media item from a subset of the captured video identified in the searching.

26. The medium of claim 25, wherein:

when the classifying identifies the captured video as representing a static event, the generated media item is a still image; and when the classifying identifies the captured video as representing a dynamic event, the generated media item is a video.

27. The medium of claim 25, wherein the feature(s) extracted are derived from object detection analysis and the classifying is based on detection of a predetermined object type from the captured video.

28. The medium of claim 25, wherein the feature(s) extracted are derived from scene recognition analysis and the classifying is based on recognition of a predetermined scene type from the captured video.

29. The medium of claim 25, wherein the feature(s) extracted are derived from motion recognition analysis and the classifying is based on recognition of a predetermined motion type from the captured video.

30. The medium of claim 25, wherein the feature(s) extracted are derived from motion recognition and object detection analyses and wherein, when a detected object is recognized to have motion that is greater than a threshold amount, the classifying identifies the captured video as representing a dynamic event, and when the detected object is recognized to have motion that is lower than a threshold amount, the classifying identifies the captured video as representing a static event.

31. The medium of claim 26, wherein:

when the classifying identifies the captured video as representing a dynamic event, the identifying frame in the captured video based on the classification comprises marking a beginning or an end of the video media item.

32. The medium of claim 26, further comprising:

when the classifying identifies the captured video as representing a static event, determining a quality level of the still image;

determining quality levels of frame(s) from the captured video;

if a determined quality level of a frame of the frame(s) is higher than the determined quality level of the still image, prompting a user of the imaging device; and if authorized by the user, replacing the still image with the higher quality frame.

33. A method for managing video captured by an imaging device, comprising:

capturing a video at the imaging device;

receiving, during the capturing of an event and at a command time after the beginning of the capturing, a command to capture the event in the captured video;

identify a type of the event as either a static event or dynamic event based on the command time after the beginning of the capturing and feature(s) extracted from the captured video;

marking the captured video based on the identified type of the event and the command time wherein the marking identifies a span of frames in the captured video with capture times surrounding the command time; and generating a media item summarizing the event from the captured video according to the marking.

34. The method of claim 1, wherein the features extracted from the captured video are extracted from a frame having a frame time at the command time.

35. The method of claim 1, wherein:

the classifying identifies an event type of the event based on the command time after the beginning of the event; and the searching is based on the event type.

36. The method of claim 1, wherein:

the classifying identifies a scene type at the command time after the beginning of the event; and the searching is based on the scene type.

37. A method for managing video captured by an imaging device, comprising:

capturing a video of an event;

receiving, at a command time during the capturing and after the beginning of the capturing, a command to capture the event in the captured video;

classifying the event as either a static event or dynamic event based on the command time after the beginning of the capturing;

extracting features from the captured video at a temporal location corresponding to the command time after the beginning of the capturing;

searching in the captured video for frames captured both before and after the command time that represent the event based on the extracted features; and generating a media item from a subset of the captured video identified in the searching.

* * * * *